(12) United States Patent
Lin et al.

(10) Patent No.: US 12,225,375 B2
(45) Date of Patent: Feb. 11, 2025

(54) AUTHENTICATION REJECT HANDLING FOR SNPN-ENABLED UE

(71) Applicant: MEDIATEK INC., Hsin-Chu (TW)

(72) Inventors: Yuan-Chieh Lin, Hsin-Chu (TW); Chia-Lin Lai, Hsin-Chu (TW)

(73) Assignee: MediaTek Inc., Hsinchu (TW)

(*) Notice: Subject to any disclaimer, the term of this patent is extended or adjusted under 35 U.S.C. 154(b) by 197 days.

(21) Appl. No.: 17/668,772

(22) Filed: Feb. 10, 2022

(65) Prior Publication Data
US 2022/0286850 A1 Sep. 8, 2022

Related U.S. Application Data

(60) Provisional application No. 63/156,972, filed on Mar. 5, 2021.

(51) Int. Cl.
*H04W 12/72* (2021.01)
*H04W 12/06* (2021.01)

(52) U.S. Cl.
CPC .......... *H04W 12/06* (2013.01); *H04W 12/72* (2021.01)

(58) Field of Classification Search
CPC ..... H04W 12/06; H04W 12/72; H04W 48/08; H04W 48/10; H04W 48/12; H04W 48/16; H04W 48/18; H04W 60/00
USPC ....................................................... 455/411
See application file for complete search history.

(56) References Cited

U.S. PATENT DOCUMENTS

| | | | |
|---|---|---|---|
| 2021/0051577 A1* | 2/2021 | Won | H04W 48/02 |
| 2021/0282084 A1* | 9/2021 | Catovic | H04W 8/26 |
| 2022/0070649 A1* | 3/2022 | Sahin | H04L 65/1073 |
| 2024/0073691 A1* | 2/2024 | Lehtovirta | H04W 12/08 |

FOREIGN PATENT DOCUMENTS

TW 202110225 A 8/2019

OTHER PUBLICATIONS

C1-210741; (3GPP TSG-CT WG1 Meeting #128-e; Feb. 17, 2021) (Year: 2021).*
Taiwan Intellectual Property Office Action, dated Aug. 14, 2023 (7 pages).

(Continued)

*Primary Examiner* — Hirdepal Singh
(74) *Attorney, Agent, or Firm* — Helen Mao; Zheng Jin; Imperium Patent Works

(57) ABSTRACT

A method of handling authentication reject upon accessing an SNPN using credentials from a credential holder is proposed. A UE is configured with a "list of subscriber data". The UE selects an SNPN using the configured list of subscriber data, e.g., based on the SNPN selection parameters contained in a selected entry of the list of subscriber data. Based on the selected entry, the UE selects an SNPN, and then tries to access the selected SNPN using credentials supplied by a subscribed SNPN. When UE receives an authentication reject message from the network, UE considers that the selected entry of the list of subscriber data is invalid. However, other entries related to the current selected SNPN are still valid. UE is still able to access the current selected SNPN, using credentials supplied in another entry of the list of subscriber data.

20 Claims, 5 Drawing Sheets

(56) References Cited

OTHER PUBLICATIONS

3GPP TS 23.122 V17.1.1 (Jan. 2021), "Technical Specification Group Core Network and Terminals;Non-Access-Stratum (NAS) functions related to Mobile Station (MS) in idle mode (Release 17)" Jan. 5, 2021.
China Intellectual Property Office Action 20221202210209427.7, dated Dec. 13, 2023 (7 pages).
3GPP TSG-CT WG1 Meeting #128-e, C1-210741, Qualcomm Incorporated, SNPN selection for access to SNPNs using credentials from an entity separate from the SNPN, Feb. 18, 2021.
Taiwan Intellectual Property Office Action 111107925, dated Feb. 20, 2024 (11 pages).
Qualcomm Incorporated, "SNPN selection for access to SNPNs using credentials from an entity separate from the SNPN", 3GPP TSG-CT WG1 Meeting #128-e C1-210741, Feb. 18, 2021 https://www.3gpp.org/ftp/tsg_ct/WG1_mm-cc-sm_ex-CN1/TSGC1_128e/Docs/C1-210741.zip.
3GPP TS 23.122 V17.1.1 (Jan. 2021), Technical Specification Group Core Network and erminals;NonAccess-Stratum (NAS) functions related to Mobile Station (MS) in idle mode (Release 17) Jan. 5, 2021 https://www.3gpp.org/ftp//Specs/archive/23_series/23.122/23122-h11.zip.

* cited by examiner

LIST OF SUBSRIBER DATA

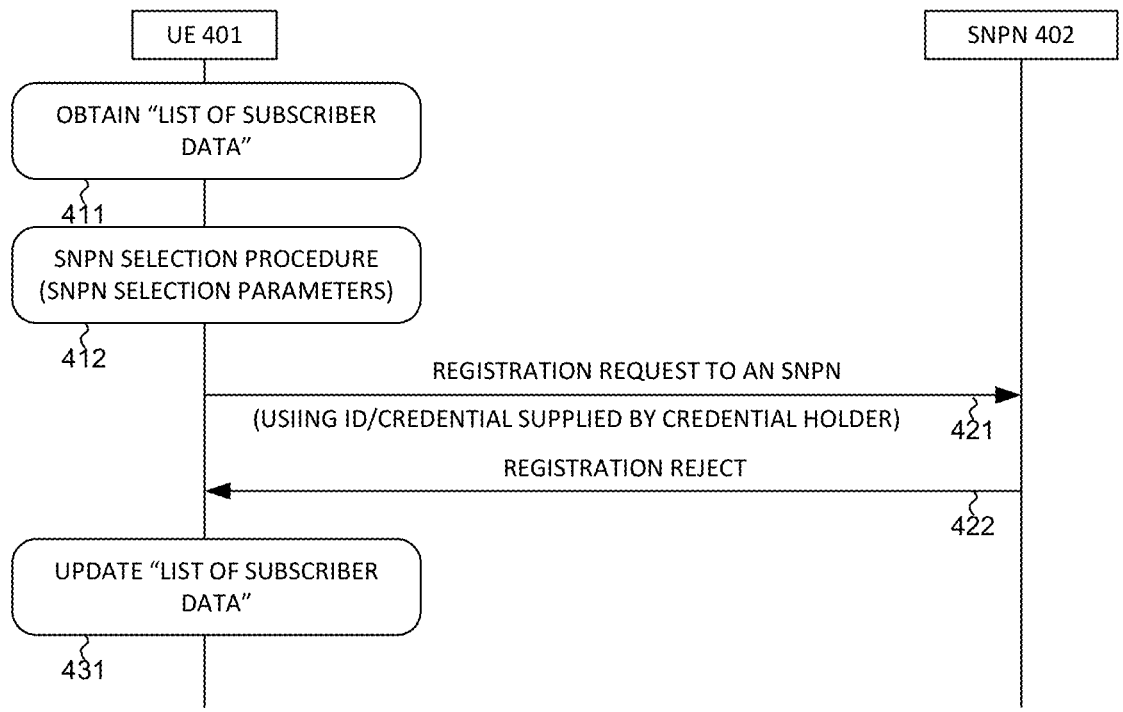

FIG. 4

Entry 1
- SNPN identity of the subscribed SNPN (SNPN #1)
- Allow access SNPN #3 using credential from CH, because SNPN #3 is in
    1) USER CONTROLLED PRIORITIZED LIST OF PREFERRED SNPNs
    2) CREDENTAIL HOLDER CONTROLLED PRIORITIZED LIST OF PREFERRED SNPNs Entry 2
- SNPN identity of the subscribed SNPN (SNPN #2)
- Allow access SNPN #3 using credential from CH, because SNPN #3 is in
    1) USER CONTROLLED PRIORITIZED LIST OF PREFERRED SNPNs
    2) CREDENTAIL HOLDER CONTROLLED PRIORITIZED LIST OF PREFERRED SNPNs Entry 3
- SNPN identity of the subscribed SNPN (SNPN #3)

FIG. 5

Entry 1
- SNPN IDENTITY OF THE SUBSCRIBED SNPN (SNPN #1)
- ALLOW ACCESS SNPN #3 USING CREDENTIAL FROM CH, BECAUSE SNPN #3 BROADCAST GIN 100, AND CREDENTAIL HOLDER CONTROLLED PRIORITIZED LIST OF GROUP IDs FOR NETWORK SELECTION GIN INCLUDES GIN 100

Entry 2
- SNPN IDENTITY OF THE SUBSCRIBED SNPN (SNPN #2)
- ALLOW ACCESS SNPN #3 USING CREDENTIAL FROM CH, BECAUSE SNPN #3 BROADCAST GIN 100, AND CREDENTAIL HOLDER CONTROLLED PRIORITIZED LIST OF GROUP IDs FOR NETWORK SELECTION GIN INCLUDES GIN 100

Entry 3
- SNPN identity of the subscribed SNPN (SNPN #3)

FIG. 6

AUTHENTICATION REJECT HANDLING FOR SNPN-ENABLED UE

CROSS REFERENCE TO RELATED APPLICATIONS

This application claims priority under 35 U.S.C. § 119 from U.S. Provisional Application No. 63/156,972, entitled "Authentication Reject Handling for SNPN-enabled UE That Supports Access to an SNPN Using Credentials from a Separate Entity", filed on Mar. 5, 2021, the subject matter of which is incorporated herein by reference.

TECHNICAL FIELD

The disclosed embodiments relate generally to wireless mobile communication network, and, more particularly, to method of authentication reject handling for Stand-alone Non-Public Network-enabled (SNPN-enabled) UE that supports access to an SNPN using credentials from a separate entity.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. Access to PLMN services is achieved by means of an air interface involving radio communications between mobile phones and base stations with integrated IP network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE), terminal equipment, mobile stations (MS), etc. Examples of different RATs include 2G GERAN (GSM) radio access network, 3G UTRAN (UMTS) radio access network, 4G E-UTRAN (LTE), 5G new radio (NR) radio access network, and other non-3GPP access RAT including WiFi.

As compared to PLMN, a non-public network (NPN) is a 5GS deployed network for non-public use. An NPN is either a Stand-alone Non-Public Network (SNPN), i.e., operated by an NPN operator and not relying on network functions provided by a PLMN; or a Public Network Integrated NPN (NPI-NPN), i.e., a non-public network deployed with the support of a PLMN. The combination of a PLMN ID and Network identifier (NID) identifies an SNPN. A UE may be enabled for SNPN. The UE selects an SNPN for which it is configured with a subscriber identifier and credentials. The UE can have several sets of subscriber identifiers, credentials, and SNPN identities.

The 5G system enables an NPN to request a third-party service provider to perform NPN authentication of a UE based on identities and/or credentials supplied by the third-party service provider. The 5G system enables an NPN to request a PLMN to perform NPN authentication of a UE based on identities and/or credentials supplied by the PLMN. A 5G system enables an SNPN to be able to request another SNPN (third-party service provider) to perform SNPN authentication of a UE based on identities and/or credentials supplied by the other SNPN (the third-party service provider). Specifically, an SNPN-enabled UE can support access to an SNPN using credentials from a credential holder. Such UE can be configured with a "list of subscriber data" containing one or more entries. Each entry of the list of subscriber data consists of information on a subscribed SNPN (which is a credential holder). Each entry of the list of subscriber data also consists of SNPN selection parameters for the purpose of access to an SNPN using credentials from the credential holder. When the UE attempts to register to the SNPN and receives a reject message, a mechanism is desired to properly handle such rejection.

SUMMARY

A method of handling authentication reject upon accessing an SNPN using credentials from a credential holder is proposed. A UE is configured with a "list of subscriber data" containing zero or more entries. The UE selects an SNPN using the configured list of subscriber data, e.g., based on the SNPN selection parameters contained in a selected entry of the list of subscriber data. Based on the selected entry, the UE selects an SNPN, and then tries to access the selected SNPN using subscriber identifier and credentials supplied by a subscribed SNPN. A subscriber identifier and credentials are available in USIM if the SNPN uses the EAP based primary authentication and key agreement procedure using the EAP-AKA' or the 5G AKA based primary authentication and key agreement procedure, otherwise a subscriber identifier and credentials are available in an entry of the "list of subscriber data" When UE receives an authentication reject message from the network, UE considers that the selected entry of the list of subscriber data is invalid. Additionally if the subscriber identifier and credentials are available in USIM, the USIM is considered as invalid for the entry. However, other entries related to the selected SNPN are still valid. UE is still able to access the selected SNPN, using credentials supplied in another entry of the list of subscriber data.

In one embodiment, a UE maintains a list of subscriber data having one or more entries. The UE is enabled to access to a stand-alone non-public network (SNPN) using credentials from a credential holder. The UE selects an entry from the list of subscriber data. The UE selects an SNPN based on SNPN selection parameters contained in the selected entry of the list of subscriber data. The selected entry comprises a subscribed SNPN identity. The UE registers to the selected SNPN (current SNPN) using credentials supplied in a universal subscriber identity module (USIM) for the selected entry, and receives a notification indicating that the UE is not authorized to access the current selected SNPN. The UE considers the selected entry of the list of subscriber data to be invalid.

Other embodiments and advantages are described in the detailed description below. This summary does not purport to define the invention. The invention is defined by the claims.

BRIEF DESCRIPTION OF THE DRAWINGS

FIG. 4 illustrates an SNPN selection and registration procedure where a UE registers to a SNPN using credentials supplied by a separate entity.

FIG. 5 illustrates embodiments of handling authentication reject for SNPN access under a first example of a list of subscriber data.

FIG. 6 illustrates embodiments of handling authentication reject for SNPN access under a second example of a list of subscriber data.

DETAILED DESCRIPTION

Reference will now be made in detail to some embodiments of the invention, examples of which are illustrated in the accompanying drawings.

Figure 1:
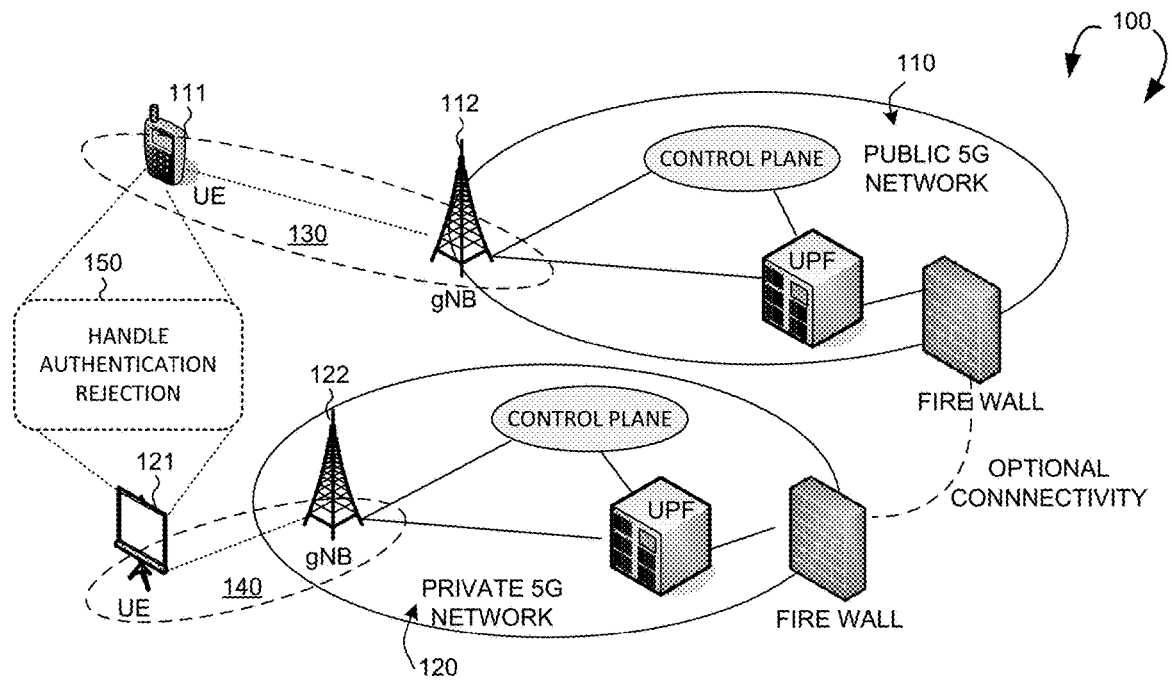
FIG. 1 schematically shows a communication system having a Public Land Mobile Network (PLMN) and a Stand-alone Non-public Network (SNPN) with authentication reject handling for an SNPN-enabled UE that supports access to an SNPN using credentials from a separate entity in accordance with one novel aspect.

FIG. 1 schematically shows a communication system 100 having a Public Land Mobile Network (PLMN) 110 and a Stand-alone Non-public Network (SNPN) 120 with authentication reject handling for an SNPN-enabled UE that supports access to an SNPN using credentials from a separate entity in accordance with one novel aspect. PLMN network 110 comprises control plane functionalities, user plane functionality (UPF), and application servers that provides various services by communicating with a plurality of user equipments (UEs) including UE 111. UE 111 and its serving base station gNB 112 belong to part of a radio access network RAN 130. RAN 130 provides radio access for UE 111 via a radio access technology (RAT), e.g. 3GPP access and non-3GPP access. A mobility management entity (MME) or an access and mobility management function (AMF) in PLMN 110 communicates with gNB 112, and other serving GW and PDN GW for access and mobility management of wireless access devices in PLMN 110 (not shown).

Similarly, SNPN network 120 comprises control plane functionalities, user plane functionality (UPF), and application servers that provides various services by communicating with a plurality of user equipments (UEs) including UE 121. UE 121 and its serving base station gNB 122 belong to part of a radio access network RAN 140. RAN 140 provides radio access for UE 121 via a radio access technology (RAT), e.g. 3GPP access and non-3GPP access. A MME or AMF in SNPN 120 communicates with gNB 122, and other serving GW and PDN GW for access and mobility management of wireless access devices in SNPN 120 (not shown). UE 111 or 121 may be equipped with a radio frequency (RF) transceiver or multiple RF transceivers for different application services via different RATs.

The 5G system enables an NPN to request a third-party service provider to perform NPN authentication of a UE based on identities and/or credentials supplied by the third-party service provider. The 5G system enables an NPN to request a PLMN to perform NPN authentication of a UE based on identities and/or credentials supplied by the PLMN. A 5G system enables an SNPN to be able to request another SNPN (third-party service provider) to perform SNPN authentication of a UE based on identities and/or credentials supplied by the other SNPN (the third-party service provider). Specifically, an SNPN-enabled UE can support access to an SNPN using credentials from a credential holder. Such UE can be configured with "a list of subscriber data" containing one or more entries. Each entry of the list consists of SNPN selection parameters for the purpose of access to an SNPN using credentials from the credential holder.

If registration on an SNPN is successful, UE indicates this SNPN is authorized for access. When a registration attempt on an SNPN is rejected by a network, the SNPN ID is written to a list of forbidden SNPNs stored in UE. The SNPN ID is removed from the list when some conditions happens, for example, when a timer is expired, a successful registration is achieved on an SNPN in the forbidden SNPN list, the UE is switched off, or the "list of subscriber data" is updated. The forbidden SNPN list is to avoid unnecessary registration attempts. However, when the UE attempts to register to an SNPN using credentials from a credential holder and receives a reject message, a different mechanism is desired to properly handle such authentication rejection.

In accordance with one novel aspect, a method of handling authentication reject by a UE upon accessing an SNPN using credentials from a credential holder is proposed (150). A UE is configured with a "list of subscriber data" containing zero or more entries. Each entry of the "list of subscriber data" consists of: a) a subscriber identifier; b) credentials; and c) an SNPN identity of the subscribed SNPN. In order to support access to an SNPN using credentials from a credential holder, each entry of the list of subscriber data further comprises "SNPN selection parameters", which consisting of: 1) a user controlled prioritized list of preferred SNPNs, where each entry contains an SNPN identity; 2) a credential holder controlled prioritized list of preferred SNPNs, where each entry contains an SNPN identity; and 3) a credential holder controlled prioritized list of Group IDs for Network Selection (GINS). Additionally, if UE has a USIM with a PLMN subscription, the UE may be configured with the SNPN selection parameters as described above, associated with the PLMN subscription.

The UE selects an SNPN using the configured list of subscriber data, e.g., based on the SNPN selection parameters contained in a selected entry of the list of subscriber data. Based on the selected entry, the UE selects an SNPN, and then tries to access the selected SNPN using credentials supplied by a subscribed SNPN. When UE receives an authentication reject message from the network, UE considers that the selected entry of the list of subscriber data is invalid. However, other entries related to the selected SNPN are still valid. UE is still able to access the selected SNPN, using credentials supplied in another entry of the list of subscriber data.

Figure 2:
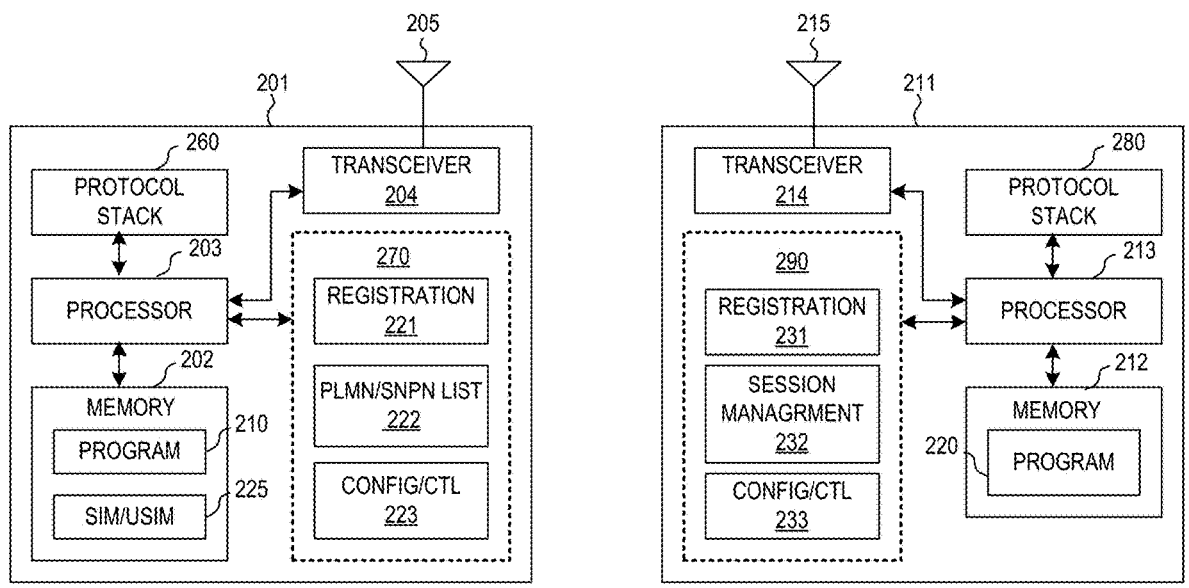
FIG. 2 illustrates simplified block diagrams of a user equipment and a network entity in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration and mobility procedure. Session management circuit 232 handles session management functionalities. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise registration circuit 221 that performs registration and mobility procedure with the network, a PLMN/SNPN list maintenance circuit 222 that handles the adding, removing, and resetting of the list of subscriber data in SIM/USIM and/or in UE memory, a config and control circuit 223 that handles configuration and control parameters. Note that the network selection and registration related information, such as HPLMN, Operator Controlled PLMN/SNPN Selector list, User Controlled PLMN/SNPN Selector list, may be stored in SIM/USIM 225 and/or in UE memory.

Figure 3:
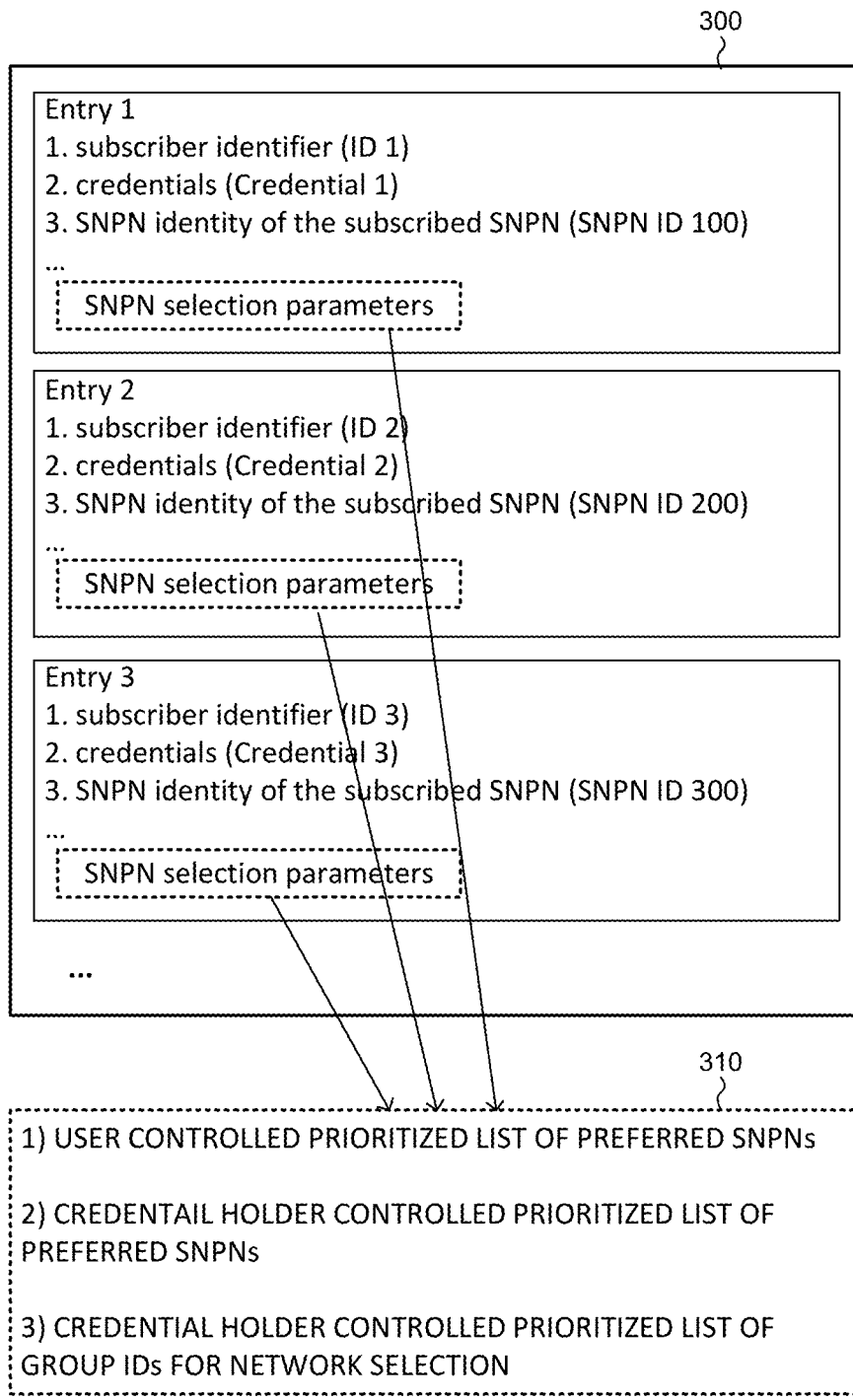
FIG. 3 illustrates an example of a UE that is configured with a list of subscriber data that includes SNPN selection parameters for supporting access to an SNPN using credentials from a credential holder.

FIG. 3 illustrates an example of a UE that is configured with a list of subscriber data that includes SNPN selection parameters for supporting access to an SNPN using credentials from a credential holder. Under the current 3GPP specification, a UE is configured with a "list of subscriber data" 300 containing zero or more entries. Each entry of the "list of subscriber data" consists of: a) a subscriber identifier in the form of a SUPI with the SUPI format "network specific identifier" containing a network-specific identifier or with the SUPI format "IMSI" containing an IMSI, except when the SNPN uses 1) the EAP based primary authentication and key agreement procedure using the EAP-AKA'; or 2) the 5G AKA based primary authentication and key agreement procedure; b) credentials, except when the SNPN uses 1) the EAP based primary authentication and key agreement procedure using the EAP-AKA'; or 2) the 5G AKA based primary authentication and key agreement procedure; and c) an SNPN identity of the subscribed SNPN. For example, as depicted in FIG. 3, the list of subscriber data contains a plurality of entries: Entry 1 comprises subscriber ID1, credential 1, and SNPN ID 100; Entry 2 comprises subscriber ID2, credential 2, and SNPN ID 300; Entry 3 comprises subscriber ID3, credential 3, and SNPN ID 300; and so on so forth for each subscribed SNPNs.

Optionally, if the SNPN-enabled UE supports access to an SNPN using credentials from a credential holder, then an entry of the list of subscriber data may consist of SNPN selection parameters for the purpose of access to an SNPN using credentials from the credential holder. As depicted by 310 in FIG. 3, the SNPN selection parameters consist of: 1) a user controlled prioritized list of preferred SNPNs, where each entry contains an SNPN identity; 2) a credential holder controlled prioritized list of preferred SNPNs, where each entry contains an SNPN identity; and 3) a credential holder controlled prioritized list of Group IDs for Network Selection (GINs). In one example, if a first subscribed SNPN entry having a list of preferred SNPN that includes a second SNPN ID, then a UE can access the second SNPN using credentials from the first SNPN. In another example, if a first subscribed SNPN entry having a list of GINs that includes a GIN and a second SNPN broadcasts the same GIN, then a UN can access the second SNPN using credentials from the first SNPN. In yet another example, if an SNPN broadcasts an indication that the SNPN allows registration attempts from MSs that are not explicitly configured to select the SNPN, then a UE can also access such SNPN.

FIG. 4 illustrates an SNPN selection and registration procedure where UE 401 registers to a SNPN 402 using credentials supplied by a separate entity. In step 411, UE 401 obtains configuration of a list of subscriber data, e.g., configured by the network. In step 412, UE 401 selects SNPN 402 according to an SNPN selection procedure. If there is at least one entry in the "list of subscriber data", there is zero or more entries in the "list of subscriber data" with SNPN selection parameters, or the UE has a USIM card with a PLMN subscription and the UE is provisioned with SNPN selection parameters associated with the PLMN subscription, then the UE selects one entry in the list of subscriber data, if any, or the PLMN subscription, if any, to be used for SNPN selection and registration.

For example, UE 401 selects an entry of the "list of subscriber data" as selected subscription, the SNPN ID of the subscribed SNPN of this selected entry is first SNPN ID. UE 401 then uses the selected subscription, based on the SNPN selection parameters in the selected entry of the "list of subscriber data", UE 401 selects an SNPN whose SNPN ID is the second SNPN ID, and registers to the second SNPN. The second SNPN can be selected because: 1) Second SNPN broadcasts the indication that access using credentials from a credentials holder is supported and which is identified by an SNPN identity contained in the user controlled prioritized list of preferred SNPNs in the selected entry of the "list of subscriber data"; 2) Second SNPN broadcasts the indication that access using credentials from a credentials holder is supported and which is identified by an SNPN identity contained in the credentials holder controlled prioritized list of preferred SNPNs in the selected entry of the "list of subscriber data"; or 3) Second SNPN broadcasts the indication that access using credentials from a credentials holder is supported and broadcast a GIN contained in the credentials holder controlled prioritized list of GINs in the selected entry of the "list of subscriber data". In another words, one of the selected entries indicates that UE 401 is allowed to access a second SNPN using credentials supplied by the first SNPN.

In step 421, UE 401 sends a registration request message to the selected SNPN 402, which is the second SNPN. The UE uses credentials supplied by the credential holder, which is the first SNPN, for the registration. In step 422, upon verifying the registration credentials, SNPN 402 rejects the registration request. SNPN 402 thus sends a registration reject message to UE 401, indicating that UE 401 is permanently or temporality not authorized to access this is selected second-SNPN using credentials supplied by the first SNPN. The rejection message can be one of: EAP-failure message in an AUTHENTICATION REJECT message and successfully integrity checked by the NAS; AUTHENTICATION REJECT message and successfully integrity checked by the NAS; REGISTRATION REJECT message with 5GMM cause value #3 (Illegal UE) or #6 (illegal ME) or #7 (5GS services not allowed); or SERVICE REJECT message with 5GMM cause value #3 (Illegal UE) or #6 (Illegal ME) or #7 (5GS services not allowed). In response, in step 431, UE 401 considers that the selected entry (the SNPN ID of this entry is the first SNPN ID) of the list of subscriber data is invalid, until the UE is switched off or the selected entry is updated. Optionally, if 1) the EAP based primary authentication and key agreement procedure using the EAP-AKA'; or 2) the 5G AKA based primary authentication and key agreement procedure is used, UE 401 considers the USIM as invalid for the entry until switching off or the UICC containing the USIM is removed. However, other entries related to the second SNPN are still valid. For example, UE 401 is still able to access the second SNPN, using credentials supplied in another entry of the list of subscriber data.

FIG. 5 illustrates embodiments of handling authentication reject for SNPN access under a first embodiment of a list of subscriber data. Under the first embodiment, the list of subscriber data comprises three entries. The first Entry 1 (subscription 1) contains an SNPN identity of the subscribed SNPN (SNPN #1), it allows access to SNPN #3 using credentials from CH, because SNPN #3 is in the corresponding SNPN selection parameters, e.g., 1) the USER CONTROLLED PRIORITIZED LIST OF PREFERRED SNPNs of this subscription (entry); or 2) the CREDENTAIL HOLDER CONTROLLED PRIORITIZED LIST OF PREFERRED SNPNs of this subscription (entry). The second Entry 2 (subscription 2) contains an SNPN identity of the subscribed SNPN (SNPN #2), it also allows access to SNPN #3 using credentials from CH, because SNPN #3 is in the corresponding SNPN selection parameters, e.g., 1) the USER CONTROLLED PRIORITIZED LIST OF PREFERRED SNPNs of this subscription (entry); or 2) the CREDENTAIL HOLDER CONTROLLED PRIORITIZED LIST OF PREFERRED SNPNs of this subscription (entry). The third Entry 3 (subscription 3) contains an SNPN identity of the subscribed SNPN (SNPN #3), without any additional SNPN selection parameters.

In one example SNPN #3 exists and it broadcasts an indication that access using credentials from a credential holder is supported by SNPN #3. Based on the list subscriber data, UE uses subscription 1 to register to SNPN #3 (current SNPN), e.g., using credentials supplied by SNPN #1. UE then receives an Authentication Rejection message via SNPN #3. In response, UE considers the selected entry of the list of subscriber data to be invalid, e.g., subscription 1 (first Entry 1) as invalid. However, both subscription 2 and subscription 3 are still valid. UE can use subscription 2 (the second Entry 2) or subscription 3 (the third Entry 3) to register SNPN #3. Note that it would be incorrect for UE to consider the entry of the "list of subscriber data" with the SNPN identity of the current SNPN to be invalid, e.g., incorrect to consider subscription 3 (the third Entry 3) or all entries to be invalid.

In an alternative example, the list of subscriber data comprises only two entries, the first Entry 1 (subscription 1) and the second Entry 2 (subscription 2) as described earlier, without having the third Entry 3 (subscription 3). SNPN #3 exists and it broadcasts an indication that access using credentials from a credential holder is supported by SNPN #3. Similar to the previous example, UE uses subscription 1 to register to SNPN #3 (current SNPN) and receives an Authentication Rejection message via SNPN #3. In response, UE considers the selected entry of the list of subscriber data to be invalid, e.g., subscription 1 (first Entry 1) as invalid. However, subscription 2 is still valid. UE can continue to use subscription 2 (the second Entry 2) to register to SNPN #3. Note that it would be incorrect for UE to consider the entry of the "list of subscriber data" with the SNPN identity of the current SNPN to be invalid, e.g., no entry or both entries (first and second) to be invalid.

FIG. 6 illustrates embodiments of handling authentication reject for SNPN access under a second embodiment of a list of subscriber data. Under the second embodiment, the list of subscriber data comprises three entries. The first Entry 1 (subscription 1) contains an SNPN identity of the subscribed SNPN (SNPN #1), and the credential holder controlled prioritized list of Group IDs for Network Selection (GIN) includes GIN 100. The second Entry 2 (subscription 2) contains an SNPN identity of the subscribed SNPN (SNPN #2), and the credential holder controlled prioritized list of Group IDs for Network Selection (GIN) includes GIN 100. The third Entry 3 (subscription 3) contains an SNPN identity of the subscribed SNPN (SNPN #3), without any additional SNPN selection parameters.

In one example, SNPN #3 exists and it broadcasts an indication that access using credentials from a credential holder is supported by SNPN #3. In addition, SNPN #3 also broadcasts GIN 100. As a result, UE knows that it can access SNPN #3 using either subscription 1 or subscription 2. For example, UE uses subscription to register to SNPN #3 (current SNPN), e.g., using credentials supplied by SNPN #1. UE then receives an Authentication Rejection message via SNPN #3. In response, UE considers the selected entry of the list of subscriber data to be invalid, e.g., subscription 1 (first Entry 1) as invalid. However, both subscription 2 and subscription 3 are still valid. UE can use subscription 2 (the second Entry 2) or subscription 3 (the third Entry 3) to register SNPN #3. Note that it would be incorrect for UE to consider the entry of the "list of subscriber data" with the SNPN identity of the current SNPN to be invalid, e.g., incorrect to consider subscription 3 (the third Entry 3) to be invalid.

In an alternative example, the list of subscriber data comprises only two entries, the first Entry 1 (subscription 1) and the second Entry 2 (subscription 2) as described earlier, without having the third Entry 3 (subscription 3). SNPN #3 exists and it broadcasts an indication that access using credentials from a credential holder is supported by SNPN #3.SNPN #3 also broadcasts GIN 100. Similar to the previous example, UE uses subscription 1 to register to SNPN #3 (current SNPN) and receives an Authentication Rejection message via SNPN #3. In response, UE considers the selected entry of the list of subscriber data to be invalid, e.g., subscription 1 (first Entry 1) as invalid. However, subscription 2 is still valid. UE can continue to use subscription 2 (the second Entry 2) to register to SNPN #3. Note that it would be incorrect for UE to consider the entry of the "list of subscriber data" with the SNPN identity of the current SNPN to be invalid, e.g., no entry to be invalid.

Figure 7:
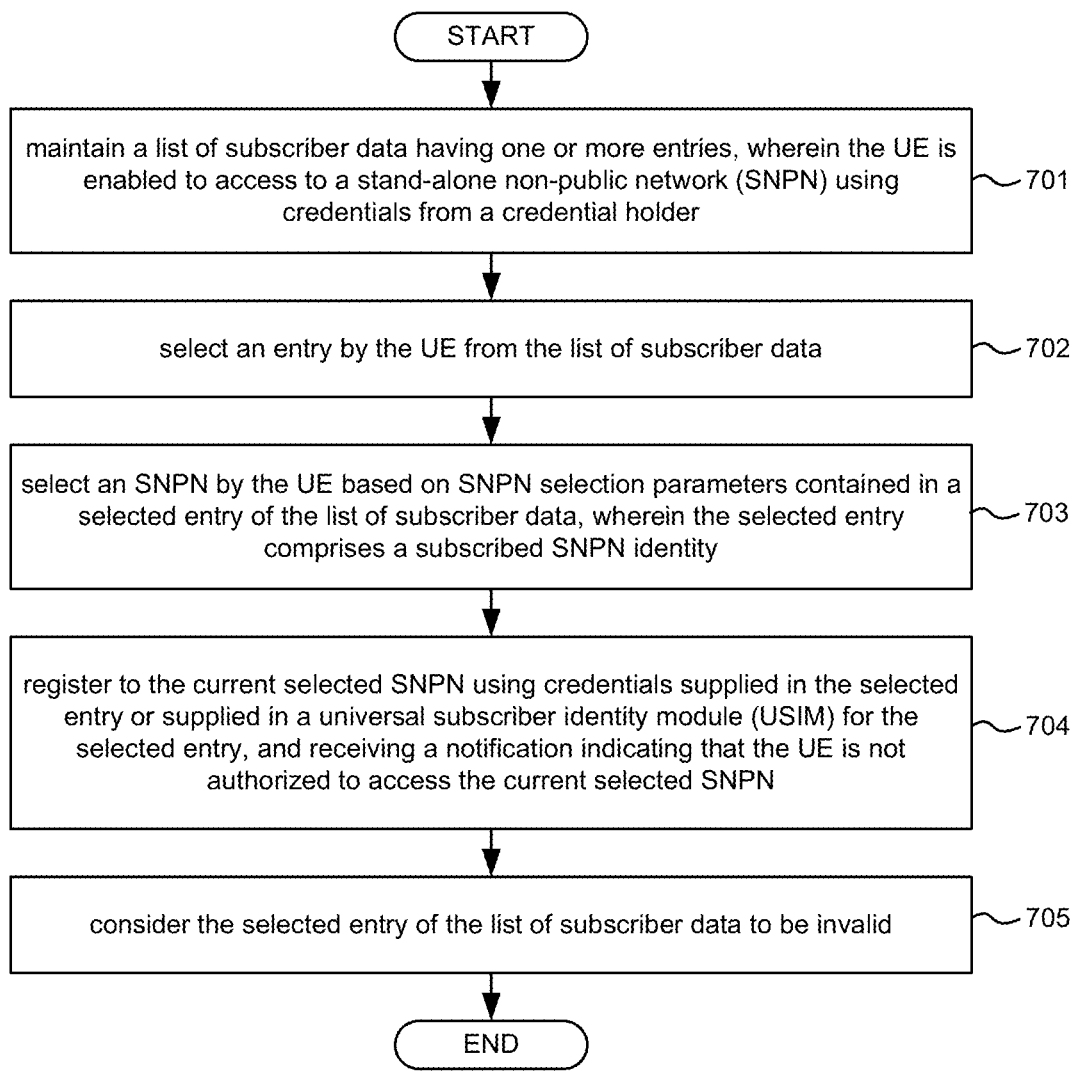
FIG. 7 is a flow chart of a method of handling authentication reject by a UE for SNPN access using credentials from a credential holder in accordance with one novel aspect.

FIG. 7 is a flow chart of a method of handling authentication reject by a UE for SNPN access using credentials from a credential holder in accordance with one novel aspect. In step 701, a UE maintains a list of subscriber data having one or more entries. The UE is enabled to access to a stand-alone non-public network (SNPN) using credentials from a credential holder. In step 702, the UE selects an entry from the list of subscriber data. In step 703, the UE selects an SNPN based on SNPN selection parameters contained in the selected entry of the list of subscriber data. The selected entry comprises a subscribed SNPN identity. In step 704, the UE registers to the selected SNPN (current SNPN) using credentials supplied in a universal subscriber identity module (USIM) for the selected entry, and receives a notification indicating that the UE is not authorized to access the current selected SNPN. In step 705, the UE considers the selected entry of the list of subscriber data to be invalid.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
maintaining a list of subscriber data having one or more entries by a user equipment (UE), wherein the UE is enabled to access to a stand-alone non-public network (SNPN) using credentials from a credential holder;
selecting an entry by the UE from the list of subscriber data;
selecting an SNPN by the UE based on SNPN selection parameters contained in the selected entry of the list of subscriber data, wherein the selected entry comprises a subscribed SNPN identity, and wherein the SNPN selection parameters of an entry comprises at least one of a user controlled prioritized list of preferred SNPNs, a credential holder controlled prioritized list of preferred SNPNs, and a credential holder controlled prioritized list of group IDs for network selection (GIN);
registering to the current selected SNPN using credentials supplied in the selected entry or supplied in a universal subscriber identity module (USIM) for the selected entry, and receiving a notification indicating that the UE is not authorized to access the current selected SNPN; and
considering the selected entry of the list of subscriber data to be invalid.

2. The method of claim 1, wherein the selected entry comprises a user controlled prioritized list of preferred SNPNs, wherein the user controlled prioritized list includes the current selected SNPN.

3. The method of claim 1, wherein the selected entry comprises a credential holder controlled prioritized list of preferred SNPNs, wherein the credential holder controlled prioritized list includes the current selected SNPN.

4. The method of claim 1, wherein the selected entry comprises a credential holder controlled prioritized list of group IDs for network selection (GIN), wherein the list of GIN includes a GIN, and wherein the current selected SNPN broadcasts the same GIN.

5. The method of claim 1, wherein the list of subscriber data comprises an entry that includes the current selected SNPN as a subscribed SNPN identity.

6. The method of claim 1, wherein the UE is allowed to register to the same selected SNPN using credentials supplied in a second entry that is different from the selected entry or supplied in the USIM for the second entry.

7. The method of claim 1, wherein the credentials are supplied in the USIM when using an EAP based primary authentication and key agreement procedure using EAP-AKA', or using a 5G AKA based primary authentication and key agreement procedure.

8. The method of claim 7, wherein the UE considers the USIM as invalid for the selected entry until switching off or a UICC (Universal Integrated Circuit Card) containing the USIM is removed.

9. The method of claim 1, wherein the UE considers the selected entry to be invalid until switching off or the selected entry is updated.

10. The method of claim 1, wherein the notification is an AUTHENTICATION REJECT message, an EAP-failure message in an AUTHENTICATION REJECT message, an REGISTRATION REJECT message with cause value #3 (Illegal UE) or #6 (Illegal ME) or #7 (5GS services not allowed), or an SERVICE REJECT message with cause value #3 (Illegal UE) or #6 (Illegal ME) or #7 (5GS services not allowed).

11. A User Equipment (UE), comprising:
a control and configuration circuit that maintains a list of subscriber data having one or more entries, wherein the UE is enabled to access to a stand-alone non-public network (SNPN) using credentials from a credential holder;
an SNPN handling circuit that selects an entry from the list of subscriber data, and also selects an SNPN based on SNPN selection parameters contained in the selected entry, wherein the selected entry comprises a subscribed SNPN identity, and wherein the SNPN selection parameters of an entry comprises at least one of a user controlled prioritized list of preferred SNPNs, a credential holder controlled prioritized list of preferred SNPNs, and a credential holder controlled prioritized list of group IDs for network selection (GIN);
a registration circuit that registers to the current selected SNPN using credentials supplied in the selected entry or supplied in a universal subscriber identity module (USIM) for the selected entry; and
a receiver that receives a notification indicating that the UE is not authorized to access the current selected SNPN, wherein the UE considers the selected entry of the list of subscriber data to be invalid.

12. The UE of claim 11, wherein the selected entry comprises a user controlled prioritized list of preferred SNPNs, wherein the user controlled prioritized list includes the current selected SNPN.

13. The UE of claim 11, wherein the selected entry comprises a credential holder controlled prioritized list of preferred SNPNs, wherein the credential holder controlled prioritized list includes the current selected SNPN.

14. The UE of claim 11, wherein the selected entry comprises a credential holder controlled prioritized list of group IDs for network selection (GIN), wherein the list of GIN includes a GIN, and wherein the current selected SNPN broadcasts the same GIN.

15. The UE of claim 11, wherein the list of subscriber data comprises an entry that includes the current selected SNPN as a subscribed SNPN identity.

16. The UE of claim 11, wherein the UE is allowed to register to the same selected SNPN using credentials supplied in a second entry that is different from the selected entry or supplied in the USIM for the second entry.

17. The UE of claim 11, wherein the credentials are supplied in the USIM when using an EAP based primary authentication and key agreement procedure using EAP-AKA', or using a 5G AKA based primary authentication and key agreement procedure.

18. The UE of claim 17, wherein the UE considers the USIM as invalid for the selected entry until switching off or a UICC (Universal Integrated Circuit Card) containing the USIM is removed.

19. The UE of claim 11, wherein the UE considers the selected entry to be invalid until switching off or the selected entry is updated.

20. The UE of claim 11, wherein the notification is an AUTHENTICATION REJECT message, an EAP-failure message in an AUTHENTICATION REJECT message, an REGISTRATION REJECT message with cause value #3 (Illegal UE) or #6 (Illegal ME) or #7 (5GS services not allowed), or an SERVICE REJECT message with cause value #3 (Illegal UE) or #6 (Illegal ME) or #7 (5GS services not allowed).

* * * * *